United States Patent
Kuwabara et al.

(10) Patent No.: US 8,388,799 B2
(45) Date of Patent: Mar. 5, 2013

(54) COMPOSITION FOR FORMING POLISHING LAYER OF CHEMICAL MECHANICAL POLISHING PAD, CHEMICAL MECHANICAL POLISHING PAD AND CHEMICAL MECHANICAL POLISHING METHOD

(75) Inventors: Rikimaru Kuwabara, Chuo-ku (JP); Takahiro Okamoto, Chuo-ku (JP); Yukio Hosaka, Chuo-ku (JP); Takafumi Shimizu, Chuo-ku (JP); Tsuyoshi Watanabe, Chuo-ku (JP)

(73) Assignee: JSR Corporation, Tokyo (JP)

( * ) Notice: Subject to any disclaimer, the term of this patent is extended or adjusted under 35 U.S.C. 154(b) by 222 days.

(21) Appl. No.: 12/357,706

(22) Filed: Jan. 22, 2009

(65) Prior Publication Data
US 2009/0191795 A1    Jul. 30, 2009

(30) Foreign Application Priority Data

Jan. 24, 2008 (JP) .................. 2008-014115
May 22, 2008 (JP) .................. 2008-134238

(51) Int. Cl.
*H01L 21/304* (2006.01)
*C08G 18/42* (2006.01)
*C08G 18/48* (2006.01)
*C08G 18/62* (2006.01)

(52) U.S. Cl. .................. 156/345.12; 525/453; 525/460; 525/455

(58) Field of Classification Search ............. 156/345.12; 525/453, 460, 455
See application file for complete search history.

(56) References Cited

U.S. PATENT DOCUMENTS

| | | | |
|---|---|---|---|
| 4,447,563 A | 5/1984 | Kanaoka et al. | |
| 4,910,281 A | 3/1990 | Johnson | |
| 4,980,108 A * | 12/1990 | Suzuki et al. | 264/134 |
| 7,183,213 B2 * | 2/2007 | Shiho et al. | 438/692 |
| 7,217,305 B2 * | 5/2007 | Hasegawa et al. | 51/298 |
| 7,329,174 B2 * | 2/2008 | Hosaka et al. | 451/527 |
| 7,357,703 B2 * | 4/2008 | Nishimura et al. | 451/527 |
| 2002/0078632 A1 | 6/2002 | Hasegawa et al. | |
| 2003/0109209 A1 | 6/2003 | Hishiki | |
| 2004/0157985 A1 * | 8/2004 | Masui et al. | 524/589 |
| 2004/0224616 A1 | 11/2004 | Shiho et al. | |
| 2005/0064709 A1 * | 3/2005 | Shimomura et al. | 438/689 |
| 2005/0222336 A1 * | 10/2005 | Okamoto et al. | 525/194 |
| 2005/0239380 A1 * | 10/2005 | Hosaka et al. | 451/41 |
| 2005/0245171 A1 * | 11/2005 | Hosaka et al. | 451/6 |
| 2005/0260929 A1 * | 11/2005 | Shiho et al. | 451/41 |
| 2006/0148391 A1 | 7/2006 | Ono et al. | |
| 2006/0280929 A1 * | 12/2006 | Shimomura et al. | 428/304.4 |

FOREIGN PATENT DOCUMENTS

| | | |
|---|---|---|
| EP | 0 309 249 A2 | 3/1989 |
| EP | 0 309 249 A3 | 3/1989 |
| EP | 1 002 817 A2 | 5/2000 |
| EP | 1 002 817 A3 | 5/2000 |
| JP | 2001-239453 | 9/2001 |
| JP | 2002-134445 | 5/2002 |
| JP | 2002-137160 | 5/2002 |
| JP | 2003-62748 | 3/2003 |
| JP | 2004-343099 | 12/2004 |
| JP | 2005-322789 | 11/2005 |
| JP | 2006-100556 | 4/2006 |
| JP | 2006-111700 | 4/2006 |
| JP | 2007-049197 | 2/2007 |
| JP | 2007-326217 | 12/2007 |

OTHER PUBLICATIONS

Office Action as received in the corresponding Japanese Patent Application No. 2009-011743 dated Oct. 30, 2012.

* cited by examiner

*Primary Examiner* — Randy Gulakowski
*Assistant Examiner* — Mike M Dollinger
(74) *Attorney, Agent, or Firm* — Oblon, Spivak, McClelland, Maier & Neustadt, L.L.P.

(57) ABSTRACT

A composition for forming a chemical mechanical polishing pad having polishing characteristics such as a high polishing rate, an excellent planarity of the polished object, and less scratches of the polished object. The composition includes (A) a polyurethane having a carbon-carbon double bond on a side chain and (B) a cross-linking agent. The polyurethane (A) is preferably a thermoplastic polyurethane (A') obtained by mixing at least components (a11) to (a13) and component (a2) in a proportion satisfying the following conditions (1) and (2) and reacting them.

10 Claims, No Drawings

COMPOSITION FOR FORMING POLISHING LAYER OF CHEMICAL MECHANICAL POLISHING PAD, CHEMICAL MECHANICAL POLISHING PAD AND CHEMICAL MECHANICAL POLISHING METHOD

BACKGROUND OF THE INVENTION

The present invention relates to a composition for forming a polishing layer of a chemical mechanical polishing pad, a chemical mechanical polishing pad having a polishing layer which is formed by using the above composition and a chemical mechanical polishing method in which chemical mechanical polishing is carried out by using the above pad.

RELATED ART

In production of semiconductor apparatuses in recent years, a chemical mechanical polishing (usually abbreviated as CMP) method is used in many cases as a polishing method by which a surface having an excellent planarity can be formed in objects to be polished. In the above chemical mechanical polishing method, a polishing result is varied to a large extent depending on a material of a polishing layer disposed in a chemical mechanical polishing pad, and therefore polishing pads having various compositions are proposed (refer to, for example, patent documents 1 to 7). In general, materials used for the polishing layer described above in the most cases are polyurethanes.

Disclosed in the patent document 1 is a technique in which a composition for a polishing pad containing a cross-linked elastomer and a polymer prepared by using a monomer having a hydrophilic functional group is used to thereby enhance a hydrophilicity on a surface of a polishing pad comprising the above composition to increase a polishing rate. Disclosed in the patent document 2 is a technique in which a polishing pad is produced by using a material obtained by blending a cross-linked diene elastomer with a polymer having an acid anhydride structure to thereby enhance a polishing rate and improve a planarity on a surface of a polished object in polishing. Disclosed in the patent document 3 is a technique in which a polishing pad comprising a urethane resin and a filler insoluble in water is produced to thereby allow a reduction in scratches generated on a surface of a polished object to be compatible with a planarity on the surface of the polished object.

However, it is difficult to obtain uniform compositions for forming a polishing pad by the techniques described in the above patent documents 1 to 3, and it has been difficult to secure all of a good polishing rate, a planarity on a surface of a polished object and a reduction in scratches on a surface of a polished object.

Described in the patent document 4 is a method in which a polishing layer of a chemical mechanical polishing pad is produced by (1) preparing an isocyanate-terminated prepolymers, (2) preparing a bubble dispersion liquid of the above prepolymer, (3) mixing in a chain extending agent, (4) heating and curing the mixture to prepare a polyurethane block and (5) slicing the above polyurethane block in the form of a pad.

However, it is difficult to evenly produce the urethane block by the method described above. Further, the mechanical property tend to be uneven on the surface of the polishing layer of the pad produced by slicing. As a result thereof, it has been difficult to evenly polish the objects to be polished.

Disclosed in the patent document 5 is a technique in which a foamed polyurethane pad produced by a reaction injection molding method is used to thereby reduce an influence exerted by a change in polishing conditions and achieve a high polishing rate, a high performance for eliminating steps and a high in-plane uniformity.

However, it is difficult to make a uniform polished surface of the polished object even considering a principle of the molding method described above, and it is apparent that the polishing rate is variable in a polished surface. As a result thereof, it has been difficult to repeatedly obtain a polished surface having an excellent in-plane uniformity.

Disclosed in the patent document 6 is a technique in which a mixture of a polyurethane and a polymer of a vinyl compound is used to thereby control a hardness of a polishing pad and allow a stabilization of a polishing rate to be compatible with a planarity.

However, the technique disclosed in the patent document 6 does not sufficiently satisfy levels required to the polishing rate, the planarity and an improvement in the scratches.

On the other hand, a chemical mechanical polishing pad comprising thermoplastic polyurethane as a constitutional component is disclosed in the patent document 7. The polishing pad described above is produced, as disclosed in the examples, by pelletizing the thermoplastic polyurethane and then heating and molding the pellets.

Patent document 1: Japanese Patent Application Laid-Open No. 134445/2002
Patent document 2: Japanese Patent Application Laid-Open No. 343099/2004
Patent document 3: Japanese Patent Application Laid-Open No. 137160/2002
Patent document 4: Japanese Patent Application Laid-Open No. 322789/2005
Patent document 5: Japanese Patent Application Laid-Open No. 062748/2003
Patent document 6: Japanese Patent Application Laid-Open No. 239453/2001
Patent document 6: Japanese Patent Application Laid-Open No. 100556/2006

DISCLOSURE OF THE INVENTION

A method described in the patent document 7 is a technique which makes it possible to evenly polish a surface of a polishing layer of the polishing pad. Accordingly, the chemical mechanical polishing pad obtained by using the thermoplastic polyurethane disclosed in the patent document 7 described above is soft and can be used in a certain case for an object to be polished having a low mechanical strength such as a low dielectric constant film.

However, the above pad is unsatisfactory to a object to be polished having a large mechanical strength such as a silicon oxide film used as a conventional insulating film in terms of a polishing rate and a durability.

Further, all of the polishing layers disposed in the polishing pads disclosed in the patent documents 4 to 6 are so-called foamed urethane pads having bubbles. Accordingly, they are effective from the viewpoint of holding a polishing agent on the surface of the polishing layer described above.

However, it is difficult to sufficiently control a size and dispersion of cells in the polishing layer which exert a large influence on a holding degree of a slurry having a decisive influence on a planarity of a polished object. Accordingly, involved therein is the problem that the polishing layer produced by chemical foaming and physical foaming is inferior in characteristics such as a mechanical strength and a planarity.

The present invention has been made in light of the circumstances described above. That is, an object of the present invention is to provide a composition for forming a polishing layer of a chemical mechanical polishing pad having polishing characteristics such as a high polishing rate, an excellent planarity of the polished object and less scratches of the polished object. Also, an object of the present invention is to provide a composition for forming a polishing layer of a chemical mechanical polishing pad which has the polishing characteristics described above and which is excellent in a mechanical strength and a processability.

Further, an object of the present invention is to provide a chemical mechanical polishing pad having a polishing layer formed by cross-linking the composition described above and a chemical mechanical polishing method in which chemical mechanical polishing is carried out by using the above pad.

Intensive investigations have been repeated by the present inventors in order to solve the problems described above. As a result thereof, it has been found that a polishing pad having a polishing layer formed by cross-linking a mixture of a polyurethane having a carbon-carbon double bond on a side chain and a cross-linking agent is provided with the polishing characteristics described above, and thus the present invention has come to be completed. That is, the present invention relates to the following embodiments [1] to [15]:

[1] A composition for forming a polishing layer of a chemical mechanical polishing pad comprising (A) a polyurethane having a carbon-carbon double bond on a side chain and (B) a cross-linking agent.

[2] The composition for forming a polishing layer of a chemical mechanical polishing pad as described in the above item [1], wherein the polyurethane (A) has at least one functional group selected from a vinyl group and an allyl group on a side chain.

[3] The composition for forming a polishing layer of a chemical mechanical polishing pad as described in the above item [1] or [2], wherein the polyurethane (A) has a conjugated diene (co)polymer skeleton.

[4] The composition for forming a polishing layer of a chemical mechanical polishing pad as described in the above item [1] or [2], wherein the polyurethane (A) has a polybutadiene skeleton.

[5] The composition for forming a polishing layer of a chemical mechanical polishing pad as described in the above item [1], wherein the polyurethane (A) is obtained by reacting at least (A11) a compound having one or more hydroxyl groups and one or more carbon-carbon double bonds with (A2) a compound which has one or more isocyanate groups and which is different from the component (A11).

[6] The composition for forming a polishing layer of a chemical mechanical polishing pad as described in the above item [1], wherein the polyurethane (A) is obtained by reacting at least (A11) a compound having one or more hydroxyl groups and one or more carbon-carbon double bonds, (A12) a polyol compound which is different from the component (A11), (A13) an organic compound which has at least two active hydrogen groups and which is different from the components (A11) and (A12) and (A2) a compound which has one or more isocyanate groups and which is different from the component (A11).

[7] The composition for forming a polishing layer of a chemical mechanical polishing pad as described in the above item [5] or [6], wherein the component (A11) is a polybutadiene which is hydroxylated at a terminal, and the polybutadiene has a number average molecular weight of 500 to 5000.

[8] The composition for forming a polishing layer of a chemical mechanical polishing pad as described in the above item [5] or [6], wherein N-1/N-2 is 7/100 to 100/100, wherein N-1 is a total mole number of hydroxyl groups contained in the component (A11) and N-2 is a total mole number of isocyanate groups contained in the component (A2).

[9] The composition for forming a polishing layer of a chemical mechanical polishing pad as described in the above item [1],
wherein the polyurethane (A) is a thermoplastic polyurethane (A') obtained by mixing at least the following components (a11) to (a13) and component (a2) in a proportion satisfying the following conditions (1) and (2) and reacting them:
(a11) an oligomer which has one or more hydroxyl groups and one or more carbon-carbon double bonds and which has a number average molecular weight of 500 to 2500,
(a12) an oligomer which has two or more hydroxyl groups and either one or both of an ether bond and an ester bond and which has a number average molecular weight of 500 to 2500 and is different from the component (a11) described above, (a13) a monomer having two hydroxyl groups and (a2) a monomer having two isocyanate groups;
(1) a value of M-1/M-OH is 0.85 to 1.10 and (2) a value of M-2/M-OH is 0.45 to 0.80, wherein M-1 is the number of isocyanate groups contained in the component (a2), M-2 is the number of hydroxyl groups contained in the component (a13) and M-OH is the total number of hydroxyl groups contained in the components (a11), (a12) and (a13).

[10] The composition for forming a polishing layer of a chemical mechanical polishing pad as described in the above item [9], wherein the thermoplastic polyurethane (A') has at least one functional group selected from a vinyl group and an allyl group.

[11] The composition for forming a polishing layer of a chemical mechanical polishing pad as described in the above item [9] or [10], wherein the thermoplastic polyurethane (A') has a conjugated diene (co)polymer skeleton.

[12] The composition for forming a polishing layer of a chemical mechanical polishing pad as described in the above item [9] or [10], wherein the thermoplastic polyurethane (A') has a polybutadiene skeleton.

[13] The composition for forming a polishing layer of a chemical mechanical polishing pad as described in the above item [1] or [9], further comprising water-soluble particles (C).

[14] A chemical mechanical polishing pad having a polishing layer formed by cross-linking the composition for forming a polishing layer of a chemical mechanical polishing pad as described in the above item [1] or [9].

[15] A chemical mechanical polishing method comprising carrying out chemical mechanical polishing with the chemical mechanical polishing pad as described in the above item [14].

According to the present invention, provided is a composition for forming a polishing layer of a chemical mechanical polishing pad provided with polishing characteristics such as a high polishing rate, an excellent planarity of the polished object and less scratches of the polished object. In particular, according to the embodiments [9] to [12] described above related to the present invention, provided is a composition for forming a polishing layer of a chemical mechanical polishing pad which has the polishing characteristics described above and which is excellent in a mechanical strength and a processability.

Further, according to the present invention, provided is a chemical mechanical polishing pad having a polishing layer formed by cross-linking the composition described above and a chemical mechanical polishing method comprising carrying out chemical mechanical polishing with the above pad.

BEST MODE FOR CARRYING OUT THE INVENTION

The composition for forming a polishing layer of a chemical mechanical polishing pad according to the present invention, the chemical mechanical polishing pad having a polishing layer formed by cross-linking the above composition and the chemical mechanical polishing method comprising carrying out chemical mechanical polishing with the above pad shall be explained below in details.

In the present invention, in a case where the chemical mechanical polishing pad described above comprises only the polishing layer formed by cross-linking the composition for forming a polishing layer described above, the above polishing layer shall be referred to merely as "the chemical mechanical polishing pad".

Composition for Forming a Polishing Layer of a Chemical Mechanical Polishing Pad:

The composition for forming a polishing layer of a chemical mechanical polishing pad according to the present invention (hereinafter referred to merely as "the composition for forming a polishing layer") is characterized by comprising (A) a polyurethane and (B) a cross-linking agent as essential components which are explained below and comprising water-soluble particles (C) as an optional component. The respective components of the composition shall be explained below in details.

<Polyurethane (A)>

The polyurethane (A) used in the present invention has a carbon-carbon double bond on a side chain. A polishing layer formed by heating the above polyurethane (A) together with the cross-linking agent (B) has a cross-linked structure. This makes it possible to enhance a hardness, an elastic modulus and a water resistance of the above polishing layer (when the chemical mechanical polishing pad comprises only the polishing layer, the polishing layer refers to the above pad; hereinafter the same shall apply).

In the present invention, assuming that a molecular structure having the longest molecular chain is a backbone polymer part, "side chain" means a molecular structure branched from the backbone polymer part. Further, "having a carbon-carbon double bond on a side chain" means a situation in which a carbon-carbon double bond is present in the molecular structure branched from the backbone polymer part of the polymer.

The polyurethane (A) is preferably a thermoplastic polyurethane. When the polyurethane (A) is a thermoplastic polyurethane, a non-cross-linked molding which is very stable at room temperature can be obtained by using the composition for forming a polishing layer described above. The above non-cross-linked molding has a fluidity at prescribed temperature or higher, and the molding having a desired shape can be obtained by applying pressure while heating.

Further, the polyurethane (A) has preferably at least one functional group selected from a vinyl group ($CH_2=CH-$) and an allyl group ($CH_2=CH-CH_2-$) on a side chain, and it has more preferably a vinyl group on a side chain. Heating and molding the above polyurethane (A) together with the cross-linking agent (B) makes it possible to readily carry out cross-linking reaction of the polyurethane (A) and makes it possible to produce the chemical mechanical polishing pad having a polishing layer having a high mechanical strength.

The polyurethane (A) has preferably a conjugated diene (co)polymer skeleton, and it has more preferably a polybutadiene skeleton. Heating and molding the above polyurethane (A) together with the cross-linking agent (B) makes it possible to readily carry out cross-linking reaction of the polyurethane (A) and makes it possible to produce the chemical mechanical polishing pad having a polishing layer provided with a high mechanical strength.

The polyurethane (A) described above is obtained, for example, by reacting at least (A11) a compound having one or more hydroxyl groups and one or more carbon-carbon double bonds with (A2) a compound which has one or more isocyanate groups and which is different from the component (A11) described above. The compounds used in the present invention may be referred to merely as "components ( - - - )" as is the case with the component (A11).

In producing the polyurethane (A), other components may be used in addition to the component (A11) and the component (A2). Examples of the other components include, a polyol compound (A12) which is different from the component (A11) and a chain extending agent (A13).

<Component (A11)>

The compound (A11) having one or more hydroxyl groups and one or more carbon-carbon double bonds which is used for producing the polyurethane (A) has one or more, preferably 1 to 2 and more preferably 2 hydroxyl groups in a molecule which are capable of being reacted with isocyanate groups contained in the component (A2). The component (A11) has a hydroxyl group in a molecule in the range described above to thereby make it possible to readily react the component (A11) with the component (A2).

Also, the component (A11) has one or more, preferably 2 or more carbon-carbon double bonds in a molecule. The component (A11) has a carbon-carbon double bond in a molecule in the range described above to thereby make it possible to readily introduce a carbon-carbon double bond into the polyurethane (A) and make it possible to set the above double bond as a cross-linking point when cross-linking the polyurethane (A).

The carbon-carbon double bond present in the component (A11) is preferably at least one functional group selected from a vinyl group and an allyl group. Introducing the above functional group into a side chain of the polyurethane (A) makes it possible to readily carry out cross-linking reaction of the above polyurethane (A).

The total mole number of the carbon-carbon double bond originating in the vinyl group is preferably 20 or more, more preferably 50 or more and further preferably 80 or more, wherein the total mole number of the carbon-carbon double bond present in the component (A11) is 100.

The higher the proportion of the carbon-carbon double bond originating in the vinyl group is, the larger the cross-linking speed of the polyurethane (A) is, and the composition for forming a polishing layer described above does not have to be heated for long time when cross-linking the above polyurethane (A). This makes it possible to inhibit oxidation degradation of the composition for forming a polishing layer described above. On the other hand, if a proportion of the carbon-carbon double bond originating in the vinyl group is too low, a hardness and an elastic modulus of the polishing layer described above are decreased, and a polishing rate thereof is reduced. In addition thereto, plastic deformation is liable to be caused on a surface of the above polishing layer. Accordingly, the polishing layer having a sufficiently high planarity is not obtained in a certain case.

The components (A11) include, for example, an oligomer (a11) satisfying the following requisites (i) to (iii), monoallyl glycol, 3-allyloxy-1,2-propanediol and 1,4-butenediol.

Further, conjugated diene homopolymers or copolymers (hereinafter referred to as "conjugated diene (co)polymers"; they include, for example, polybutadiene which is hydroxylated at a terminal) other than the oligomer (a11) may be used as the component (A11).

A styrene-reduced number average molecular weight of the polybutadiene described above which is measured by gel permeation chromatography (GPC) is preferably 500 to 5000. If a number average molecular weight of the polybutadiene falls in the range described above, a hydroxyl group present in the polybutadiene can sufficiently be reacted with an isocyanate group present in the component (A2). This makes it possible to sufficiently enlarge a number average molecular weight of the polyurethane (A) and makes it possible to enhance a mechanical strength of the polishing layer described above.

Among them, the oligomer (a11) satisfying the following requisites (i) to (iii) is preferred. The above components (A11) may be used alone or in combination of two or more kinds thereof.

<<Oligomer (a11)>>

The oligomer (a11) satisfying the following requisites (i) to (iii) is particularly preferably used as the component (A11). The oligomer (a11) has (i) one or more, preferably 2 hydroxyl groups, (ii) one or more, preferably 2 or more carbon-carbon double bonds and (iii) a styrene-reduced number average molecular weight of preferably 500 to 2500, more preferably 750 to 2500 and further preferably 1000 to 2000 which is measured by gel permeation chromatography (GPC).

The oligomer (a11) has a hydroxyl group in a molecule in the range described above to thereby make it possible to readily react the component (A2) with the oligomer (a11).

The oligomer (a11) having a carbon-carbon double bond in a molecule in the range described above is used to thereby make it possible to readily introduce a carbon-carbon double bond into the polyurethane (A) and make it possible to set the above double bond as a cross-linking point when cross-linking the polyurethane (A) That is, the defect of the thermoplastic polyurethane that it is inferior in a mechanical strength is solved by cross-linking the polyurethane (A) in the manner described above.

In this respect, the oligomer (a11) has preferably a carbon-carbon double bond on a side chain. Heating both of the polyurethane (A) and the cross-linking agent (B) makes it possible to readily cross-link the polyurethane (A) by using the oligomer (a11) having a carbon-carbon double bond on a side chain and makes it possible to provide the polishing layer of the chemical mechanical polishing pad with a cross-linking structure. This makes it possible to improve mechanical characteristics such as a hardness and an elastic modulus of the polishing layer described above and a water resistance thereof.

Further, the carbon-carbon double bond present in the oligomer (a11) is preferably at least one functional group selected from a vinyl group and an allyl group, more preferably a vinyl group. A cross-linking reaction of the polyurethane (A) can readily be carried out by using the oligomer (a11) having the above functional group.

The total mole number of the carbon-carbon double bond originating in the vinyl group is preferably 20 or more, more preferably 50 or more and particularly preferably 80 or more, wherein the total mole number of the carbon-carbon double bond present in the oligomer (a11) is 100.

The higher the proportion of the carbon-carbon double bond originating in the vinyl group is, the larger the cross-linking speed of the polyurethane (A) is, and it does not have to be heated for long time when cross-linked. This makes it possible to inhibit oxidation degradation of the composition for forming a polishing layer described above. On the other hand, if a proportion of the carbon-carbon double bond originating in the vinyl group is too low, a hardness and an elastic modulus of the polishing layer described above are decreased, and a polishing rate thereof is reduced. In addition thereto, plastic deformation is liable to be caused on a surface of the polishing layer described above. Accordingly, the polishing layer having a sufficiently high planarity is not obtained in a certain case.

If a number average molecular weight of the oligomer (a11) falls in the range described above, a hydroxyl group present in the oligomer (a11) can sufficiently be reacted with an isocyanate group present in the component (A2). This makes it possible to sufficiently increase a molecular weight of the polyurethane (A) and makes it possible to enhance a mechanical strength of the polishing layer described above.

The oligomer (a11) is preferably a conjugated diene (co)polymer having a hydroxyl group. The conjugated diene (co)polymers described above include, for example, butadiene homopolymer (polybutadiene), isoprene homopolymer (polyisoprene), butadiene-styrene copolymer, butadiene-isoprene copolymer, butadiene-acrylonitrile copolymer, butadiene-2-ethylhexyl acrylate copolymer and butadiene-n-octadecyl acrylate copolymer. Among them, polybutadiene and polyisoprene are preferred since the polyurethane (A) can readily be cross-linked at low temperature in forming the polishing layer of the pad.

The conjugated diene (co)polymer described above has to have a hydroxyl group. In order to enhance a reactivity thereof with the component (a2), one single end of the conjugated diene (co)polymer is preferably modified by a hydroxyl group, and the other single end is preferably modified by a hydroxyl group, a carboxyl group or an amino group.

A conjugated diene (co)polymer skeleton can be introduced into the polyurethane (A) by using the conjugated diene (co)polymer having a hydroxyl group as the oligomer (a11). This allows the cross-linking reaction to quickly proceed by heating the polyurethane (A) together with the cross-linking agent (B) and makes it possible to produce the chemical mechanical polishing pad having a polishing layer provided with a high mechanical strength.

<Component (A2)>

The compound (A2) which is used for producing the polyurethane (A) and has one or more isocyanate groups and which is different from the compound (A11) has one or more, preferably two isocyanate groups in a molecule which are capable of being reacted with a hydroxyl group present in the component (A11).

The monomer (a2) having two isocyanate groups is preferred as the compound (A2) because of the reasons that a molecular weight of the polyurethane (A) can sufficiently be enlarged and that the polyurethane (A) can be improved in a heat resistance.

<<Monomer (a2)>>

The monomers (a2) include diisocyanates used in producing usual polyurethanes. The diisocyanates described above include, for example, aromatic diisocyanates such as 2,4-tolylenediisocyanate, 2,6-tolylenediisocyanate, 2,2'-diphenylmethanediisocyanate, 2,4'-diphenylmethanediisocyanate, 4,4'-diphenylmethanediisocyanate, napthalenediisocyanate, 1,5-napthalenediisocyanate, p-phenylenediisocyanate, m-phenylenediisocyanate, p-xylenediisocyanate and m-xylenediisocyanate; aliphatic diisocyanates such as ethylenediisocyanate, 2,2,4-trimethylhexamethylenediisocyanate and 1,6-hexamethylenediisocyanate; and alicyclic diisocyanates such as isophoronediisocyanate and norbornenedilsocyanate.

Among them, 2,4-tolylenediisocyanate, 2,6-tolylenediisocyanate, 4,4'-diphenylmethanediisocyanate and isophoronediisoycanate are preferred from the viewpoints that they are readily available and that it is easy to control reaction thereof with a hydroxyl group present in the component (A11). The monomer (a2) may be used alone or in combination of two or more kinds thereof.

—Other Components—

In producing the polyurethane (A), other components such as the polyol compound (A12) and the chain extending agent (A13) may be used, as described above, in addition to the component (A11) and the component (A2).

<Polyol Compound (A12)>

The polyurethane (A) used in the present invention can be produced by using in combination the polyol compound (A12) which is different from the component (A11) in addition to the component (A11) and the component (A2).

Polyol compounds usually used in the technical field of polyurethane can be used as the polyol compound (A12). Examples of the polyol compound (A12) include, for example, hydroxy-end polyesters, polyetherpolyols, polyesterpolyols, polycarbonatepolyols, polyestercarbonatepolyols, polyethercarbonatepolyols and polyesteramidepolyols.

Among them, the polyetherpolyols and the polycarbonatepolyols each having a good hydrolytic resistance are preferred, and the polyetherpolyols are particularly preferred from the viewpoints that they are less expensive and that they have a low melt viscosity and are readily processed.

The polyetherpolyols include, for example, polytetramethylene glycol (PTMG), polypropylene glycol (PPG) and polyethylene glycol (PEG). The polyesterpolyols include, for example, polybutylene adipate, polyhexamethylene adipate and polycaprolactonepolyol.

The polycarbonatepolyols include, for example, reaction products of at least one diol selected from 1,3-propanediol, 1,4-butanediol, 1,6-hexanediol, diethylene glycol, polyethylene glycol, polypropylene glycol and polytetramethylene glycol with phosgene, diaryl carbonate (for example, diphenyl carbonate) or cyclic carbonate (for example, propylene carbonate).

The polyestercarbonatepolyols include reaction products of polyester glycols such as polycaprolactonepolyol with alkylene carbonates such as ethylene carbonate; and reaction products of organic dicarboxylic acids with reaction mixtures obtained by reacting alkylene carbonates such as ethylene carbonate with polyhydric alcohols.

The polyol compound (A12) may be used alone or in combination of two or more kinds thereof.

The polyol compounds having a number average molecular weight falling in a range of 500 to 2000 are preferably used as the polyol compound (A12) from the viewpoint of an elastic characteristic of the polyurethane (A).

The oligomer (a12) which satisfies the following requisites (i) to (iii) and which is different from the oligomer (a11) is also preferably used as the polyol compound (A12).

<<Oligomer (a12)>>

The oligomer (a12) satisfying the following requisites (i) to (iii) is particularly preferably used as the component (A12). The oligomer (a12) has (i) two or more, preferably 2 to 3 hydroxyl groups, (ii) either one or both of an ether bond and an ester bond and (iii) a styrene-reduced number average molecular weight of preferably 500 to 2500, more preferably 500 to 2000 and further preferably 600 to 1800 which is measured by gel permeation chromatography (GPC).

The oligomer (a12) has a hydroxyl group in a molecule in the range described above to thereby make it possible to readily react the component (A2) with the oligomer (a12).

The oligomer (a12) has either one or both of an ether bond and an ester bond in a molecule to thereby make it possible to obtain the polyurethane (A) which is inexpensive and shows a good mechanical strength.

If a number average molecular weight of the oligomer (a12) falls in the range described above, mechanical strengths such as an elastic modulus of the polyurethane (A) can be controlled in a suitable range. If the number average molecular weight is larger than the range described above, a mechanical strength of the polyurethane (A) can not be enhanced even after cross-linked, and the chemical mechanical polishing pad which can actualize a high polishing rate is not obtained in a certain case. Further, if the number average molecular weight is smaller than the range described above, the processable temperature described later is elevated, and the polyurethane (A) can not be blended with the cross-linking agent (B) in a certain case. As a result thereof, plastic deformation is liable to be caused on the surface of the polishing layer of the resulting chemical mechanical polishing pad, and a planarity thereof is deteriorated in a certain case.

<Chain Extending Agent (A13)>

The polyurethane (A) used in the present invention can be produced by using in combination the chain extending agent (A13) in addition to the component (A11) and the component (A2). The chain extending agent (A13) is an organic compound which has at least two, preferably two active hydrogen groups and which is different from the component (A11) and the polyol compound (A12). The active hydrogen groups include, for example, a hydroxyl group, a primary amino group, a secondary amino group and a thiol (SH) group. Among them, a hydroxyl group is preferred.

The chain extending agents (A13) include, for example, the monomer (a13) having two hydroxyl groups and polyamines. Among them, the monomer (a13) is preferred.

<<Monomer (a13)>>

The monomer (a13) is preferably low molecular weight diols. A molecular weight of the low molecular weight diols is preferably smaller than the molecular weights of the oligomer (a11) and the oligomer (a12), and it is more preferably 50 to 300.

The low molecular weight diols include low molecular weight dihydric alcohols such as ethylene glycol, 1,2-propylene glycol, 1,3-propylene glycol, 1,4-butanediol, 1,6-hexanediol, neopentyl glycol, 1,4-cyclohexanedimethanol, 3-methyl-1,5-pentanediol, diethylene glycol, triethylene glycol and 1,4-bis(2-hydroxyethoxy)benzene.

Among them, ethylene glycol, 1,2-propylene glycol, 1,3-propylene glycol, 1,4-butanediol and 1,6-hexanediol are preferred from the viewpoint that reaction thereof with an isocyanate group present in the component (A2) is readily controlled. The low molecular weight dihydric alcohols may be used alone or in combination of two or more kinds thereof.

<<Polyamines>>

The polyamines include, for example, 4,4'-methylenebis (o-chloroaniline), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, 1,2-bis(2-aminophenylthio)ethane and 4,4'-diamino-3,3'-diethyl-5,5'-dimethyldiphenylmethane. The above polyamines may be used alone or in combination of two or more kinds thereof.

<Production Conditions of the Polyurethane (A)>

Polyurethane obtained by mixing and reacting the component (A11) and the component (A2) each described above in a proportion satisfying conditions described below is preferably used as the polyurethane (A) used in the present invention.

That is, N-1/N-2 is preferably 7/100 to 100/100, more preferably 10/100 to 50/100 and further preferably 15/100 to 30/100, wherein N-1 is a total mole number of hydroxyl groups contained in the component (A11) and N-2 is a total mole number of isocyanate groups contained in the component (A2).

Polyurethane having a hardness, an elastic modulus and a residual strain which is suitable for a material of the polishing layer of the chemical mechanical polishing pad is obtained by using the component (A11) and the component (A2) in the range of the value of N-1/N-2 described above.

If a use amount of the component (A11) is smaller than the range described above, cross-linking is insufficient, and a water resistance and a heat stability of the polishing layer of the chemical mechanical polishing pad are unsatisfactory in a certain case. On the other hand, if a use amount of the component (A11) is larger than the range described above, the cross-linking degree is increased, and therefore a hardness of the chemical mechanical polishing pad grows excessively large in a certain case.

A ratio of the component (A2), the polyol compound (A12) and the chain extending agent (A13) in the present invention can be changed to various extents according to the molecular weights of the respective components and the desired physical properties of the chemical mechanical polishing pad. In order to obtain the chemical mechanical polishing pad having desired polishing characteristics, a ratio of the polyol compound (A12) to the chain extending agent (A13) is suitably set according to characteristics required to polyurethane produced from them.

The use amounts of the above compounds (the component (A2), the polyol compound (A12) and the chain extending agent (A13)) are preferably 10% by weight or more, more preferably 20% by weight or more and further preferably 30% by weight or more base on the total weight of the whole components constituting the polyurethane (A).

<Production Conditions of the Polyurethane (A')>

The thermoplastic polyurethane (A') (hereinafter referred to merely as "the polyurethane (A')") obtained by mixing and reacting at least the components (a11) to (a13) and the component (a2) each described above in a proportion satisfying conditions (1) and (2) described below is particularly preferably used as the polyurethane (A) used in the present invention.

(1) a value of M-1/M-OH falls in a range of preferably 0.85 to 1.10, more preferably 0.90 to 1.10 and further preferably 0.90 to 1.05 and (2) a value of M-2/M-OH falls in a range of preferably 0.45 to 0.80, more preferably 0.50 to 0.70 and further preferably 0.50 to 0.60, wherein M-1 is the number of isocyanate groups contained in the component (a2), M-2 is the number of hydroxyl groups contained in the component (a13) and M-OH is the total number of hydroxyl groups contained in the components (a11), (a12) and (a13), in a mixture of the components (a11) to (a13) and the component (a2).

In general, polyurethane is constituted from a hard segment which has a high melting point and is provided with a stiffness and a soft segment which has a low melting point and which is soft and provides an elasticity.

However, when the value of M-1/M-OH and the value of M-2/M-OH are smaller than the ranges described above, a proportion of the hard segment is decreased. Accordingly, a mechanical strength of the thermoplastic polyurethane is reduced even after cross-linked, and the chemical mechanical polishing pad which can actualize a high polishing rate is not obtained in a certain case.

On the other hand, when the value of M-1/M-OH and the value of M-2/M-OH are larger than the ranges described above, a proportion of the hard segment is elevated. Accordingly, the processable temperature grows too high, and it is difficult in a certain case to blend the cross-linking agent (B). As a result thereof, plastic deformation is liable to be caused on the surface of the polishing layer of the resulting chemical mechanical polishing pad, and a planarity thereof is deteriorated in a certain case. Or, even if the cross-linking agent (B) can be blended, the polishing layer is stiff, and therefore the performance of scratch is deteriorated in a certain case.

The polyurethane (A') obtained in the manner described above is mixed with the cross-linking agent (B) in producing the composition for forming a polishing layer, and therefore mixing and processing can be carried out preferably at temperature at which decomposition reaction of the cross-linking agent (B) does not proceed. For example, organic peroxides which are conventionally used as the cross-linking agent (B) have a ten hour half-life temperature of 150° C. or lower, and therefore mixing and processing can be carried out preferably at a temperature of 150° C. or lower. This makes it possible to obtain the composition for forming a polishing layer which is excellent in a processability.

In the present invention, a flow initiation temperature is employed as an index for a processable temperature of the polyurethane (A'). The flow initiation temperature described above is measured according to "10. Flow test" of JIS K7311, and the specific measuring conditions are described in the examples. A flow initiation temperature of the polyurethane (A') measured in the manner described above falls in a range of preferably 60 to 130° C., more preferably 70 to 120° C. and further preferably 80 to 110° C.

If the flow initiation temperature is higher than the range described above, cross-linking reaction proceeds in mixing the polyurethane (A') with the cross-linking agent (B), and it is difficult in a certain case due to gelation and a rise in the viscosity to produce the composition for forming a polishing layer. On the other hand, if the flow initiation temperature is lower than the range described above, it means that a molecular weight of the polyurethane (A') is low. Accordingly, a mechanical strength of the polishing layer is not sufficiently high, and the chemical mechanical polishing pad which can actualize a high polishing rate is not obtained in a certain case.

A flow initiation temperature of the polyurethane (A') can be controlled to the range described above by setting the values of M-1/M-OH and M-2/M-OH to the ranges (1) and (2) described above. This makes it possible to use organic peroxides having a ten hour half-life temperature of preferably 150° C. or lower, more preferably 140° C. or lower as the cross-linking agent (B).

The polyurethane (A') has preferably at least one functional group selected from a vinyl group and an allyl group and has particularly preferably a vinyl group. Having the above functional groups allows the cross-linking reaction to quickly proceed by heating and molding the polyurethane (A') together with the cross-linking agent (B) and results in making it possible to produce the chemical mechanical polishing pad having a polishing layer provided with a high mechanical strength by using the polyurethane (A').

Further, the polyurethane (A') contains constitutional units originating in the foregoing components (a11) to (a13) and the component (a2) as repetitive units, and therefore it is the polyurethane provided with a very high cross-linking efficiency by the cross-linking agent (B) such as organic peroxides generating radicals and an electron beam. That is, using the polyurethane (A') makes it possible to control physical properties such as a polishing rate and a mechanical strength of the chemical mechanical polishing pad to a large extent.

<Cross-Linking Agent (B)>

The composition for forming a polishing layer according to the present invention contains the cross-linking agent (B). The cross-linking agent (B) is blended in order to cross-link the polyurethane (A). This makes it possible to provide the polishing layer with a cross-linking structure in forming the above polishing layer by using the composition for forming a polishing layer according to the present invention.

In the present invention, particularly when the polyurethane (A') is used as the polyurethane (A), the non-cross-linked polyurethane (A') can be mixed, as described above, with the cross-linking agent (B) at low temperature, and therefore a mixture containing the polyurethane (A') and the cross-linking agent (B) can stably be obtained without allowing the cross-linking agent (B) to be reacted.

The polyurethane (A') is thermoplastic, and therefore the composition described above can be molded without cross-linking it by subjecting it to press processing at suitable temperature. Further, the polyurethane (A') contained in the molding obtained can readily be cross-linked by processing the molding, for example, at a temperature of 160 to 220° C. As a result thereof, the physical properties such as the processability and the planarity are extraordinarily enhanced, and the pad showing physical properties suited to chemical mechanical polishing is obtained.

Cross-linking is carried out preferably by chemical cross-linking using organic peroxides, sulfur, sulfur compounds and the like, and chemical cross-linking carried out by using organic peroxides which generate radicals by heating is more preferred.

The organic peroxides described above include, for example, ketone peroxides, peroxyketals, hydroperoxide, dialkyl peroxides, diacyl peroxides, peroxycarbonates and peroxyesters. Among them, dialkyl peroxides are preferred from the viewpoint of the cross-linking speed, and they include, to be specific, dicumyl peroxide and 2,5-dimethyl-2,5-bis(t-butylperoxy)hexane. The organic peroxides described above may be used alone or in combination of two or more kinds thereof.

<Water-Soluble Particles (C)>

The composition for forming a polishing layer according to the present invention may further contain the water-soluble particles (C). The water-soluble particles (C) are released from the surface of the polishing layer of the chemical mechanical polishing pad by bringing into contact with a slurry comprising a polishing agent and a medicinal solution and are used for forming pores in which the above slurry can be held.

Thus, in the present invention, pores are formed on the chemical mechanical polishing pad without using a polyurethane foam having a bubble structure on a surface by using the water-soluble particles (C) described above, and holding of the slurry is improved more. Accordingly, the polishing layer of the chemical mechanical polishing pad obtained is (1) excellent in a mechanical strength since it is non-foamed and a solid-core matter and (2) excellent in a planarity since a sophisticated technique by which a foamed cell structure is evenly controlled is not required.

The water-soluble particles (C) may be present in a situation in which they are evenly dispersed in the polyurethane (A) or may be present in the polyurethane (A) in a phase separation situation as is the case with a sea-island structure, and they are present preferably in a situation in which they are evenly dispersed in the polyurethane (A).

The water-soluble particles (C) include, for example, materials dissolved in water as is the case with water-soluble polymers and in addition thereto, materials which can be swollen or gelatinized by bringing into contact with water as is the case with water-absorbing polymers and which can be released from the surface of the polishing layer. The water-soluble particles described above include, for example, organic water-soluble particles and inorganic water-soluble particles.

Materials constituting the organic water-soluble particles described above include, for example, saccharides (polysaccharides such as starch, dextrin and cyclodextrin, lactose, mannit), celluloses (hydroxypropyl cellulose, methyl cellulose and the like), proteins, polyvinyl alcohol, polyvinylpyrrolidone, polyacrylic acid, polyethylene oxide, water-soluble light-sensitive resins, sulfonated polyisoprene and sulfonated isoprene copolymers.

Materials constituting the inorganic water-soluble particles described above include, for example, potassium acetate, potassium nitrate, potassium carbonate, potassium hydrogencarbonate, potassium bromide, potassium phosphate, potassium sulfate, magnesium sulfate and calcium nitrate.

The materials described above may be used alone or in combination of two or more kinds there as the materials constituting the water-soluble particles (C) described above. Further, one kind of water-soluble particles comprising a prescribed material may be used, and two or more kinds of water-soluble particles comprising different materials may be used.

The water-soluble particles (C) (particularly the organic water-soluble particles) are particularly preferably solid-core matters from the viewpoint that mechanical strengths such as a hardness and others of the polishing layer can be set to appropriate values.

An average particle diameter of the water-soluble particles (C) is preferably 0.1 to 500 μm, more preferably 0.5 to 100 μm. A size of the pores formed by the water-soluble particles (C) which are released from the surface of the polishing layer of the chemical mechanical polishing pad is preferably 0.1 to 500 μm, more preferably 0.5 to 100 μm. If an average particle diameter of the water-soluble particles (C) falls in the range described above, the chemical mechanical polishing pad having a polishing layer which shows a high polishing rate and which is excellent in a mechanical strength can be produced.

A value of an average particle diameter of the water-soluble particles (C) in the present invention is a value measured by a laser diffraction method on measuring conditions shown in examples described later.

The water-soluble particles (C) are dissolve or swollen in water only when they are exposed on the surface of the polishing layer of the chemical mechanical polishing pad, and they do not preferably absorb moisture and are not swollen in an inside of the polishing layer. In this connection, an outer shell for inhibiting moisture absorption and swelling is preferably formed at least in a part of an outermost part of the water-soluble particles (C). In this case, the water-soluble particles (C) may contain water-soluble particles having an outer shell and water-soluble particles having no outer shell, and the water-soluble particles having an outer shell can sufficiently provide the effect described above even if the whole surface thereof is not covered with the outer shell.

In this regard, the outer shell described above may be adsorbed physically on the water-soluble particle or may be bonded chemically to the water-soluble particle or may be brought into contact with the water-soluble particle by both of adsorption and chemical bonding. Materials for forming the outer shell described above include, for example, epoxy resins, polyimide, polyamide, polysilicate, silane coupling agents.

<Production of Composition for Forming a Polishing Layer>

The composition for forming a polishing layer according to the present invention contains the cross-linking agent (B) in an amount of preferably 0.1 to 10 parts by weight, more preferably 0.1 to 5 parts by weight and further preferably 0.1 to 3 parts by weight based on 100 parts by weight of the polyurethane (A). If a content of the cross-linking agent (B) falls in the range described above, the chemical mechanical polishing pad having a polishing layer which is excellent in mechanical characteristics such as a hardness, an elastic modulus and a residual strain is obtained.

On the other hand, if a content of the cross-linking agent (B) is lower than the range described above, the cross-linking reaction does not sufficiently proceed, and a hardness and an elastic modulus of the polishing layer described above are reduced. Accordingly, the polishing rate is lowered in chemical mechanical polishing, and a residual strain of the polishing layer is increased, so that it is difficult in a certain case to evenly flatten a object to be polished. On the other hand, if a content of the cross-linking agent (B) exceeds the range described above, a hardness and an elastic modulus of the polishing layer described above grow high, and scratches of the polished object are increased in a certain case.

The composition for forming a polishing layer according to the present invention contains the water-soluble particles (C) in an amount of preferably 1 to 300 parts by weight, more preferably 1 to 250 parts by weight, further preferably 1 to 200 parts by weight, further more preferably 3 to 200 parts by weight and particularly preferably 3 to 150 parts by weight based on 100 parts by weight of the polyurethane (A). If a content of the water-soluble particles (C) falls in the range described above, the chemical mechanical polishing pad which shows a high polishing rate in chemical mechanical polishing and which has a mechanical strength such as an appropriate hardness can be produced.

The composition for forming a polishing layer according to the present invention may be blended with additives such as an antioxidant for preventing deterioration of the above composition, a cross-linking auxiliary agent for accelerating cross-linking reaction, and an organic filler and an inorganic filler for controlling a hardness of the polishing layer to an appropriate value as long as the purpose of the present invention is not damaged. Further, it may be blended with a water-soluble filler.

A production process of the composition for forming a polishing layer according to the present invention shall not specifically be restricted, and it can be obtained, for example, by mixing the components described above by means of a mixer. Devices which have so far been publicly known can be used as the mixer and include, for example, a roll, a kneader, a Banbury mixer and an extruding machine.

<Chemical Mechanical Polishing Pad>

The chemical mechanical polishing pad according to the present invention is characterized by having a polishing layer formed by cross-linking the composition for forming a polishing layer described above. The chemical mechanical polishing pad according to the present invention shall not specifically be restricted in a constitution, and it is constituted, for example, from the polishing layer described above and a transparent member comprising a light transmitting material formed in the polishing layer. Further, a buffer pad obtained by molding a foamed polyurethane may be laminated on one surface of the polishing layer described above. Also, the chemical mechanical polishing pad according to the present invention may be constituted only from the polishing layer.

The polishing layer described above can be formed by cross-linking the composition for forming a polishing layer described above preferably at 160 to 220° C., more preferably 170 to 200° C. The physical properties described later can markedly be enhanced as compared with those of the polishing layer staying in a non-cross-linking state by carrying out the cross-linking described above.

Further, grooves for holding the slurry may be provided on the surface of the polishing layer described above brought into contact with an object to be polished. The grooves described above shall not specifically be restricted as long as they have a surface shape holding the slurry, and examples of the shape include a concentric circle shape and a lattice shape.

The transparent member described above is provided preferably in order to confirm always a polished surface of a polished object by an optical detection method using a laser beam to detect a polishing end point.

The polishing layer described above is produced by, for example, injecting the composition for forming a polishing layer described above into a mold and heating it to thereby cross-link the composition to produce a molding and, if necessary, polishing a surface and a rear surface of the above molding. Accordingly, the chemical mechanical polishing pad having the polishing layer described above according to the present invention is excellent in a processability and a planarity as compared with a pad produced by once forming a polyurethane block and then slicing it, and the object to be polished can evenly be polished thereby.

The polishing layer present in the chemical mechanical polishing pad according to the present invention has an elastic modulus of preferably 50 to 500 MPa which is measured by measuring (30° C.) a dynamic viscoelasticity based on JIS K7244. Further, the polishing layer has a residual strain of preferably 10% or less, more preferably 5% or less which is calculated from an equation of {(a whole length of the sample after broken−a whole length of the sample before the test)/(a whole length of the sample before the test)}×100 after carrying out a tensile test based on JIS K6251. Also, it has a duro D hardness of preferably 30 to 90, more preferably 35 to 80 which is measured based on JIS K6253.

As a result thereof, the chemical mechanical polishing pad according to the present invention has a good elasticity recuperative power, and therefore displacement caused by a shear stress exerted on the above pad in polishing can be controlled to a small level. The elastic modulus and the residual strain each falling in the ranges described above make it possible to effectively inhibit the pores described above from being buried by a non-water-soluble part which is excessively stretched in dressing and polishing to cause plastic deformation and inhibit the surface of the polishing layer of the chemical mechanical polishing pad from excessively fuzzing.

Accordingly, pores are efficiently formed as well in dressing; a holding property of the slurry in polishing is prevented from being reduced; and the excellent polished planarity having less fuzzing can be obtained. Dressing is a method in which the surface of the polishing layer of the chemical mechanical polishing pad is fuzzed by means of, for example, a diamond grinding stone before a object to be polished is subjected to chemical mechanical polishing. If dressing is carried out, abrasive gains contained in a polishing agent are liable to be held on the surface of the polishing layer of the polishing pad, and therefore the polishing rate is enhanced.

Further, scattering of the polishing rate on the surface of the object to be polished can be controlled.

A ratio of a storage elastic modulus at 30° C. to a storage elastic modulus at 60° C. in the chemical mechanical polishing pad according to the present invention is set preferably to 3 to 10 by producing the polishing pad by cross-linking the composition for forming a polishing layer described above. This makes it possible to allow the chemical mechanical polishing pad described above to exhibit different polishing performances by controlling the temperature in polishing.

<Chemical Mechanical Polishing Method Carried Out by Using Chemical Mechanical Polishing Pad>

The chemical mechanical polishing method according to the present invention comprises carrying out chemical mechanical polishing with the chemical mechanical polishing pad described above. This makes it possible to provide the chemical mechanical polishing method which is excellent in polishing characteristics such as a high polishing rate, an excellent planarity of the polished object and less scratches of the polished object.

EXAMPLES

The present invention shall specifically be explained below with reference to examples.

<Flow Initiation Temperature (Processing Temperature)>

A test sample and a test apparatus were used based on "10. Flow test" of JIS K7311, and a flow initiation temperature of the thermoplastic polyurethane was measured on the following conditions.

Test apparatus: CFT-500 (manufactured by Shimadzu Corporation)
Preheating condition: 90° C.×4 minutes
Heating rate: 3° C./minute
Initiation temperature: 90° C.
Test load: 98N
Die used: diameter 1 mm, length 1 mm A test sample comprising thermoplastic polyurethane was preheated, and then heating was initiated at the same time as applying a test load. Temperature at which the thermoplastic polyurethane was initiated to flow from a die was set to a flow initiation temperature (processing temperature) of the thermoplastic polyurethane.

<GPC Measurement>

A number average molecular weight (Mn) of the respective components was measured by means of a gel permeation chromatography (GPC) (apparatus model number "HLC-8120", column model number "TSK-GEL α-M", manufactured by Tosoh Corp.).

Measuring method: gel permeation chromatography (GPC) method
Standard substance: styrene standard
Apparatus: HLC-8120, manufactured by Tosoh Corp.
Column: TSK-GEL α-M, manufactured by Tosoh Corp.
Solvent: THF
Concentration: 0.2% by mass
Injected amount: 100 μL
Flow rate: 1 μL/minute
Pressure: 64 kgf/cm$^2$ <Average Particle Diameter of Water-Soluble Particles (C)>

An average particle diameter of the water-soluble particles (C) was measured by a laser diffraction method using a measuring apparatus: HORIBA LA-500 and a dispersant: 1-butanol.

<Production and Evaluation of Chemical Mechanical Polishing Pad>

(1) Production of Polishing Layer Substrate:

Compositions for forming a polishing layer obtained in examples and comparative examples described below were subjected to cross-linking reaction at 160° C. for 7 minutes in a mold to obtain a cylindrical molding having a diameter of 790 mm and a thickness of 3.2 mm. Then, a rectangular through-hole having a length of 58 mm in a radial direction and a length of 22 mm in a tangent line direction was formed by means of an end mill (manufactured by KATO MACHINE CORPORATE) such that the center of the rectangular through-hole was 105 mm away from the center of the molding. A polishing layer substrate having a hole part was thus produced.

(2) Preparation of Raw Material Composition for Transparent Member:

(2-1) Cases of Examples 1-1 to 1-5 and Comparative Examples 1-1 to 1-2

1,2-Polybutadiene (trade name "JSR RB830", manufactured by JSR Corporation) 98% by volume and β-cyclodextrin (trade name "Dexipearl β-100", average particle diameter: 20 μm, manufactured by Ensuiko Sugar Refining Co., Ltd.) 2% by volume as the water-soluble particles (C) were kneaded by means of a extruder heated at 160° C.

Then, added thereto was dicumyl peroxide (trade name "Percumyl D-40", manufactured by NOF CORPORATION) 0.7 part by weight (corresponding to 0.28 part by weight in terms of pure dicumyl peroxide) as a cross-linking agent based on 100 parts by weight of 1,2-polybutadiene contained in the kneaded matter thus obtained, and the mixture was further kneaded to thereby obtain a raw material composition for a transparent member.

(2-2) Cases of Examples 2-1 to 2-17 and Comparative Examples 2-1 to 2-3

1,2-Polybutadiene (trade name "JSR RB83", manufactured by JSR Corporation) 100 parts by weight and β-cyclodextrin (trade name "Dexipearl β-100", average particle diameter: 20 μm, manufactured by Ensuiko Sugar Refining Co., Ltd.) 3 parts by weight as the water-soluble particles (C) were kneaded by means of a extruder heated at 140° C.

Then, added thereto was dicumyl peroxide (trade name "Percumyl D-40", manufactured by NOF CORPORATION) 0.7 part by weight (corresponding to 0.28 part by weight in terms of pure dicumyl peroxide) as a cross-linking agent based on 100 parts by weight of 1,2-polybutadiene contained in the kneaded matter thus obtained, and the mixture was further kneaded to thereby obtain a raw material composition for a transparent member.

(3) Production of Pad:

The polishing layer substrate produced in (1) described above was set again in the mold, and the hole part of the above polishing layer substrate was filled with the raw material composition for a transparent member prepared in (2-1) or (2-2) described above.

Then, a metal block having almost the same planar shape and size a those of the hole part and a thickness of 1.5 mm was put into a residual space of the hole part, and cross-linking reaction was carried out at 180° C. for 10 minutes, whereby obtained was a cylindrical molding which had a diameter of 790 mm and a thickness of 3.2 mm and in which the transparent member was fused in the hole part.

The molding thus obtained was set in a loading port of a wide belt sander equipment (manufactured by Meinan Machinery Works, Inc.), and sand papers (manufactured by Covac Co., Ltd.) having grain size meshes #120, #150 and #220 were used in succession to polish a surface and a rear surface of the molding by each 0.1 mm per sand paper by moving the respective sand papers at a speed of 0.1 m/second while rotating a roller at 500 rpm (the total polished amount on the surface and the rear surface was 0.3 mm respectively).

Then, only the surface (surface to be a polished face) was further polished by 0.1 mm in the same manner as described above using the sand paper of #320 to obtain a pad having a diameter of 790 mm and a thickness of 2.5 mm.

(4) Production of Chemical Mechanical Polishing Pad:

The pad produced above was fixed by suction on a surface plate of a cutting processing machine (manufactured by Kato Machine Corporate) at a suction pressure of 20 kPa. In the above state, concentric grooves each having a width of 0.5 mm and a depth of 1 mm were formed in a pitch of 2 mm at a place far by a radius of 10 mm from the center, and a place far by 254 mm from the center was cut by means of the above machine to thereby produce a chemical mechanical polishing pad having a diameter of 508 mm and a thickness of 2.5 mm.

(5) Evaluation of Polishing Layer of Chemical Mechanical Polishing Pad:

A tensile test based on JIS K6251 was carried out, and a residual strain of the polishing layer of the chemical mechanical polishing pad produced in (4) described above was calculated from an equation of {(a whole length of the sample after broken−a whole length of the sample before the test)/(a whole length of the sample before the test)}×100. Further, a duro D hardness of the polishing layer above was measured based on JIS K6253.

(6) Evaluation of Chemical Mechanical Polishing:

A double-faced tape #422 manufactured by 3M Company was laminated on a surface of the chemical mechanical polishing pad produced in (4) described above on which the grooves were not formed. Then, the above pad was mounted in a chemical mechanical polishing machine (model number "Mirra", manufactured by Applied Materials, Inc.) to carry out chemical mechanical polishing on the following conditions, and the above pad was evaluated according to items described below.

Head revolution: 120 rpm
Head load: 1.5 psi (10.3 kPa)
Platen revolution: 120 rpm
Flow rate of aqueous dispersion for chemical mechanical polishing: 200 ml/minute
Aqueous dispersion for chemical mechanical polishing: CMS 7401/CMS 7452 (manufactured by JSR Corporation)

(i) Calculation of Copper Polishing Rate:

A substrate prepared by providing a copper film having a film thickness of 15000 Å on an 8 inch thermally oxidized film-provided silicon substrate was used as a object to be polished to carry out chemical mechanical polishing for one minute on the conditions described above, and the film thicknesses of the copper film before and after polished were measured by means of a sheet resistance measuring device (model "OMNIMAP RS75", manufactured by KLA Tencor Corporation). The polishing rate was calculated from the film thicknesses before and after polished and the polishing time.

(ii) Polishing Test of Pattern-Provided Substrate:

Sematech 854 Pattern Wafer (trade name, manufactured by Sematech Inc.; pattern-provided substrate for a polishing test prepared by depositing in order tantalum film having a thickness of 250 Å and copper film having a thickness of 11000 Å on an insulating film having various patterns formed thereon was used as a object to be polished.

Time spent from the time of initiating polishing to the time of finishing polishing (a time point in which exposure of a tantalum film was detected from a change in an intensity of light emitted from a light source installed on a surface plate and reflected from the wafer described above was set as the time of finishing polishing) was set as end point detection time, and polishing time was set to 1.2 time as large as the end point detection time. The chemical mechanical polishing was carried out on the conditions described above, and the planarity and the scratches were evaluated in the following manners.

(ii-1) Evaluation of Planarity:

In a part in which a pattern prepared by allowing a copper wiring part having a width of 100 μm and an insulator part having a width of 100 μm to be continued alternately was continued by 3.0 mm in a longitudinal direction of the above pattern, a dished amount (hereinafter referred to as "dishing") of the copper wiring part was measured by means of a precise step meter (model "HRP-240", manufactured by KLA Tencor Corporation) to thereby evaluate dishing which was an indicator of a planarity.

(ii-2) Evaluation of Scratches:

Two hundred unit regions having a range of 120 μm×120 μm in the copper wiring part were selected at random and observed in a dark field under an optical microscope to count the number of the unit regions in which scratches were generated as a scratch number.

Production Example 1-1

A four neck separable flask of 2 L equipped with a stirrer was charged with 51.0 parts by weight of polytetramethylene glycol (trade name "PTMG-1000SN"; hereinafter referred to as "PTMG-1000", Mn=1000, manufactured by Hodogaya Chemical Co., Ltd.) as the component (a12) under air atmosphere, and the solution was stirred after controlling the temperature to 60° C.

Then, the flask described above was charged with 36.5 parts by weight of 4,4'-diphenylmethanediisocyanate (trade name "MILLIONATE MT"; hereinafter referred to as "MDI", manufactured by Nippon Polyurethane Industry Co., Ltd.) as the component (a2) dissolved on an oil bath of 80° C., and after stirring and mixing the solution for 10 minutes, 2.3 parts by weight of 1,4-butanediol (trade name "14BG"; hereinafter referred to as "14BG", manufactured by Mitsubishi Chemical Corporation) as the component (a13) and 10.1 parts by weight of 3-allyloxy-1,2-propanediol as the component (A11) were added thereto, stirred and mixed.

Next, the mixture thus obtained was spread on a SUS-made bat subjected to surface processing and annealed at 110° C. for one hour and further at 80° C. for 16 hours to obtain a thermoplastic polyurethane a.

Production Example 1-2

A four neck separable flask of 2 L equipped with a stirrer was charged with 50.2 parts by weight of "PTMG-1000" described above as the component (a12) and 15.6 parts by weight of polybutadiene which was hydroxylated at an end (trade name "NISSO PB G-1000"; hereinafter referred to as "G-1000", Mn=1500, manufactured by Nippon Soda Co., Ltd.) as the component (a11) under air atmosphere, and the solution was stirred after controlling the temperature to 60° C.

Then, the flask described above was charged with 28.8 parts by weight of "MDI" described above as the component (a2) dissolved on an oil bath of 80° C., and after stirring and mixing the solution for 10 minutes, 5.5 parts by weight of "14BG" described above as the component (a13) was added thereto, stirred and mixed.

Next, the mixture thus obtained was spread on a SUS-made bat subjected to surface processing and annealed at 110° C. for one hour and further at 80° C. for 16 hours to obtain a thermoplastic polyurethane b.

Production Example 1-3

A four neck separable flask of 2 L equipped with a stirrer was charged with 42.7 parts by weight of "PTMG-1000" as the component (a12) and 24.1 parts by weight of "G-1000" described above as the component (a11) under air atmosphere, and the solution was stirred after controlling the temperature to 60° C.

Then, the flask described above was charged with 27.8 parts by weight of "MDI" as the component (a2) dissolved on an oil bath of 80° C., and after stirring and mixing the solution for 10 minutes, 5.2 parts by weight of "14BG" as the component (a13) was added thereto, stirred and mixed.

Next, the mixture thus obtained was spread on a SUS-made bat subjected to surface processing and annealed at 110° C. for one hour and further at 80° C. for 16 hours to obtain a thermoplastic polyurethane c.

Production Example 1-4

A four neck separable flask of 2 L equipped with a stirrer was charged with 33.5 parts by weight of "PTMG-1000" as the component (a12) and 34.7 parts by weight of "G-1000" as the component (a11) under air atmosphere, and the solution was stirred after controlling the temperature to 60° C.

Then, the flask described above was charged with 26.7 parts by weight of "MDI" as the component (a2) dissolved on an oil bath of 80° C., and after stirring and mixing the solution for 10 minutes, 5.0 parts by weight of "14BG" as the component (a13) was added thereto, stirred and mixed.

Next, the mixture thus obtained was spread on a SUS-made bat subjected to surface processing and annealed at 110° C. for one hour and further at 80° C. for 16 hours to obtain a thermoplastic polyurethane d.

Production Example 1-5

A four neck separable flask of 2 L equipped with a stirrer was charged with 63.8 parts by weight of "PTMG-1000" as the component (a12) under air atmosphere, and the solution was stirred after controlling the temperature to 60° C.

Then, the flask described above was charged with 30.5 parts by weight of "MDI" as the component (a2) dissolved on an oil bath of 80° C., and after stirring and mixing the solution for 10 minutes, 5.7 parts by weight of "14BG" as the component (a13) was added thereto, stirred and mixed.

Next, the mixture thus obtained was spread on a SUS-made bat subjected to surface processing and annealed at 110° C. for one hour and further at 80° C. for 16 hours to obtain a thermoplastic polyurethane e.

Production Example 2-1

A four neck separable flask of 2 L equipped with a stirrer was charged with 31.9 parts by weight of "PTMG-1000" as the component (a12) and 35.0 parts by weight of "G-1000" as the component (a11) under air atmosphere, and the solution was stirred after controlling the temperature to 60° C.

Then, the flask described above was charged with 27.6 parts by weight of "MDI" as the component (a2) dissolved on an oil bath of 80° C., and after stirring and mixing the solution for 10 minutes, 5.5 parts by weight of "14BG" as the component (a13) was added thereto, stirred and mixed.

Next, the mixture thus obtained was spread on a SUS-made bat subjected to surface processing and reacted while left standing still at 110° C. for one hour, and it was annealed further at 80° C. for 16 hours to obtain a thermoplastic polyurethane A.

Production Example 2-2

A four neck separable flask of 2 L equipped with a stirrer was charged with 35.0 parts by weight of "G-1000" as the component (a11), 30.7 parts by weight of "PTMG-1000" as the component (a12) and 5.5 parts by weight of "14BG" as the component (a13) under air atmosphere, and the solution was stirred after controlling the temperature to 80° C.

Then, the flask described above was charged with 28.8 parts by weight of "MDI" as the component (a2) dissolved on an oil bath of 80° C., and after stirring and mixing the solution for 3 minutes, the mixture thus obtained was spread on a SUS-made bat subjected to surface processing and heated at 110° C. for one hour and further at 80° C. for 16 hours to obtain a thermoplastic polyurethane B.

Production Example 2-3

A thermoplastic polyurethane C was obtained in the same manner as in Production Example 2-1, except that added were 31.3 parts by weight of "MDI" as the component (a2), 6.4 parts by weight of "14BG" as the component (a13), 35.0 parts by weight of "G-1000" as the component (a11) and 27.3 parts by weight of polytetramethylene glycol (trade name "PTMG-650SN", Mn=700, manufactured by Hodogaya Chemical Co., Ltd.) as the component (a12).

Production Example 2-4

A thermoplastic polyurethane D was obtained in the same manner as in Production Example 2-1, except that added were 27.6 parts by weight of "MDI" as the component (a2), 5.5 parts by weight of "14BG" as the component (a13), 35.0 parts by weight of "G-1000" as the component (a11) and 31.9 parts by weight of polycarbonatediol (trade name "NIPPOLAN 981", Mn=1000, manufactured by Nippon Polyurethane Industry Co., Ltd.) as the component (a12).

Production Example 2-5

A thermoplastic polyurethane E was obtained in the same manner as in Production Example 2-1, except that added were 21.8 parts by weight of "MDI" as the component (a2), 4.4 parts by weight of "14BG" as the component (a13), 35.0 parts by weight of "G-1000" as the component (a11) and 38.8 parts by weight of polytetramethylene glycol (trade name "PTMG-2000", Mn=2000, manufactured by Mitsubishi Chemical Corporation) as the component (a12).

Production Example 2-6

A thermoplastic polyurethane F was obtained in the same manner as in Production Example 2-1, except that added were 27.3 parts by weight of "MDI" as the component (a2), 6.2 parts by weight of "14BG" as the component (a13), 36.0 parts by weight of polyisoprene which was hydroxylated at an end (trade name "Poly ip", Mn=2500, manufactured by Idemitsu Kosan Co., Ltd.) as the component (a11) and 30.5 parts by weight of "PTMG-1000" as the component (a12).

Production Example 2-7

A thermoplastic polyurethane G was obtained in the same manner as in Production Example 2-1, except that added were 27.0 parts by weight of "MDI" as the component (a2), 5.0 parts by weight of "14BG" as the component (a13), 46.0 parts by weight of polybutadiene which was hydroxylated at an end (trade name "NISSO PB G-2000", Mn=2000, manufactured by Nippon Soda Co., Ltd.) as the component (a11) and 22.0 parts by weight of "PTMG-1000" as the component (a12).

Production Example 2-8

A thermoplastic polyurethane H was obtained in the same manner as in Production Example 2-1, except that added were 26.0 parts by weight of "MDI" as the component (a2), 3.2 parts by weight of ethylene glycol (manufactured by Mitsubishi Chemical Corporation) as the component (a13), 34.3 parts by weight of "G-1000" as the component (a11) and 36.5 parts by weight of "PTMG-1000" as the component (a12).

Production Example 2-9

A thermoplastic polyurethane I was obtained in the same manner as in Production Example 2-1, except that added were 19.0 parts by weight of tolylenediisocyanate (trade name. "Cosmonate T-100", manufactured by Mitsui Chemicals Polyurethanes, Inc.) as the component (a2), 5.9 parts by weight of "14BG" as the component (a13), 52.5 parts by weight of "G-1000" as the component (a11) and 22.6 parts by weight of "PTMG-1000" as the component (a12).

Production Example 2-10

A thermoplastic polyurethane J was obtained in the same manner as in Production Example 2-1, except that added were 33.9 parts by weight of "MDI" as the component (a2), 6.9 parts by weight of "14BG" as the component (a13), 35.7 parts by weight of "G-1000" as the component (a11) and 23.5 parts by weight of polyethylene glycol (trade name "PEG 1500", Mn=550, manufactured by Sanyo Chemical Industries, Ltd.) as the component (a12).

Production Example 2-11

A thermoplastic polyurethane K was obtained in the same manner as in Production Example 2-1, except that added were 31.1 parts by weight of "MDI" as the component (a2), 5.2 parts by weight of "14BG" as the component (a13) 35.0 parts by weight of "G-1000" as the component (a11) and 28.7 parts by weight of "PTMG-1000" as the component (a12).

Production Example 2-12

A thermoplastic polyurethane L was obtained in the same manner as in Production Example 2-1, except that added were 43.5 parts by weight of "MDI" as the component (a2), 13.7 parts by weight of "14BG" as the component (a13), 35.0 parts by weight of "G-1000" as the component (a11) and 7.8 parts by weight of "PTMG-1000" as the component (a12).

Production Example 2-13

A thermoplastic polyurethane M was obtained in the same manner as in Production Example 2-1, except that added were 25.1 parts by weight of "MDI" as the component (a2), 5.9 parts by weight of "14BG" as the component (a13), 35 parts by weight of "G-1000" as the component (a11) and 34.0 parts by weight of "PTMG-1000" as the component (a12)

Production Example 2-14

A thermoplastic polyurethane N was obtained in the same manner as in Production Example 2-1, except that added were 24.4 parts by weight of "MDI" as the component (a2), 4.2 parts by weight of "14BG" as the component (a13), 35.0 parts by weight of "G-1000" as the component (a11) and 36.4 parts by weight of "PTMG-1000" as the component (a12).

Production Example 2-15

A thermoplastic polyurethane O was obtained in the same manner as in Production Example 2-1, except that added were 23.5 parts by weight of "MDI" as the component (a2), 4.6 parts by weight of "14BG" as the component (a13), 35.0 parts by weight of polybutadiene which was hydroxylated at an end (trade name "NISSO PB G-3000"; hereinafter referred to as "G-3000", Mn=3000, manufactured by Nippon Soda Co., Ltd.) as the component (a11) and 36.9 parts by weight of "PTMG-1000" as the component (a12).

Production Example 2-16

A thermoplastic polyurethane P was obtained in the same manner as in Production Example 2-1, except that added were 18.7 parts by weight of "MDI" as the component (a2), 3.7 parts by weight of "14BG" as the component (a13), 35.0 parts by weight of "G-1000" as the component (a11) and 42.6 parts by weight of polytetramethylene glycol (trade name "PTMG-3000SN", Mn=3000, manufactured by Hodogaya Chemical Co., Ltd.) as the component (a12).

The compositions of the thermoplastic polyurethanes a to e obtained in Production Examples 1-1 to 1-5 are shown in Table 1, and the compositions and the processing temperatures of the thermoplastic polyurethanes A to P obtained in Production Examples 2-1 to 2-16 are shown in Table 2.

TABLE 1

| Poly-ure-thane | Components (A11), (a11) | | | Component (a12) | | | Component (a13) | | | Component (a2) | | | M-1/M-OH | M-2/M-OH | N-1/N-2 |
|---|---|---|---|---|---|---|---|---|---|---|---|---|---|---|---|
| | Kind | Weight part | Molecular weight | Kind | Weight part | Molecular weight | Kind | Weight part | Molecular weight | Kind | Weight part | Molecular weight | | | |
| a | AOPD*[1] | 10.1 | 132 | PTMG | 51.0 | 1000 | 14 GB | 2.3 | 90 | MDI | 36.5 | 250 | 0.95 | 0.17 | 0.52 |
| b | G-1000 | 15.6 | 1500 | PTMG | 50.2 | 1000 | 14 GB | 5.5 | 90 | MDI | 28.8 | 250 | 0.95 | 0.50 | 0.09 |
| c | G-1000 | 24.1 | 1500 | PTMG | 42.7 | 1000 | 14 GB | 5.2 | 90 | MDI | 27.8 | 250 | 0.95 | 0.50 | 0.14 |

TABLE 1-continued

| | Components (A11), (a11) | | | Component (a12) | | | Component (a13) | | | Component (a2) | | | | | |
|---|---|---|---|---|---|---|---|---|---|---|---|---|---|---|---|
| Poly-ure-thane | Kind | Weight part | Molecular weight | Kind | Weight part | Molecular weight | Kind | Weight part | Molecular weight | Kind | Weight part | Molecular weight | M-1/M-OH | M-2/M-OH | N-1/N-2 |
| d | G-1000 | 34.7 | 1500 | PTMG | 33.5 | 1000 | 14 GB | 5.0 | 90 | MDI | 26.7 | 250 | 0.95 | 0.50 | 0.22 |
| e | — | — | — | PTMG | 63.8 | 1000 | 14 GB | 5.7 | 90 | MDI | 30.5 | 250 | — | — | — |

*¹3-allyloxy-1,2-propanediol

TABLE 2

| | Components (A11), (a11) | | | Component (a12) | | | Component (a13) | | | Component (a2) | | | | | Processing |
|---|---|---|---|---|---|---|---|---|---|---|---|---|---|---|---|
| Poly-ure-thane | Kind | Weight part | Molecular weight | Kind | Weight part | Molecular weight | Kind | Weight part | Molecular weight | Kind | Weight part | Molecular weight | M-1/M-OH | M-2/M-OH | temperature (° C.) |
| A | G-1000 | 35.0 | 1500 | PTMG | 31.9 | 1000 | 14 GB | 5.5 | 90 | MDI | 27.6 | 250 | 0.95 | 0.53 | 105 |
| B | G-1000 | 35.0 | 1500 | PTMG | 30.7 | 1000 | 14 GB | 5.5 | 90 | MDI | 28.8 | 250 | 1.00 | 0.53 | 110 |
| C | G-1000 | 35.0 | 1500 | PTMG | 27.3 | 700 | 14 GB | 6.4 | 90 | MDI | 31.3 | 250 | 0.94 | 0.53 | 100 |
| D | G-1000 | 35.0 | 1500 | PCD | 31.9 | 1000 | 14 GB | 5.5 | 90 | MDI | 27.6 | 250 | 0.95 | 0.53 | 115 |
| E | G-1000 | 35.0 | 1500 | PTMG | 38.8 | 2000 | 14 GB | 4.4 | 90 | MDI | 21.8 | 250 | 0.95 | 0.53 | 110 |
| F | Poly ip | 36.0 | 2500 | PTMG | 30.5 | 1000 | 14 GB | 6.2 | 90 | MDI | 27.3 | 250 | 0.96 | 0.61 | 125 |
| G | G-2000 | 46.0 | 2000 | PTMG | 22.0 | 1000 | 14 GB | 5.0 | 90 | MDI | 27.0 | 250 | 1.07 | 0.55 | 120 |
| H | G-1000 | 34.3 | 1500 | PTMG | 36.5 | 1000 | EG | 3.2 | 62 | MDI | 26.0 | 250 | 0.94 | 0.47 | 105 |
| I | G-1000 | 52.5 | 1500 | PTMG | 22.6 | 1000 | 14 GB | 5.9 | 90 | TDI | 19.0 | 174 | 0.89 | 0.53 | 110 |
| J | G-1000 | 35.7 | 1500 | PEG-1500 | 23.5 | 550 | 14 GB | 6.9 | 90 | MDI | 33.9 | 250 | 0.95 | 0.54 | 125 |
| K | G-1000 | 35.0 | 1500 | PTMG | 28.7 | 1000 | 14 GB | 5.2 | 90 | MDI | 31.1 | 250 | 1.13 | 0.53 | 165 |
| L | G-1000 | 35.0 | 1500 | PTMG | 7.8 | 1000 | 14 GB | 13.7 | 90 | MDI | 43.5 | 250 | 0.95 | 0.83 | 180 |
| M | G-1000 | 35.0 | 1500 | PTMG | 34.0 | 1000 | 14 GB | 5.9 | 90 | MDI | 25.1 | 250 | 0.82 | 0.53 | 95 |
| N | G-1000 | 35.0 | 1500 | PTMG | 36.4 | 1000 | 14 GB | 4.2 | 90 | MDI | 24.4 | 250 | 0.92 | 0.44 | 100 |
| O | G-3000 | 35.0 | 3000 | PTMG | 36.9 | 1000 | 14 GB | 4.6 | 90 | MDI | 23.5 | 250 | 0.94 | 0.51 | 110 |
| P | G-1000 | 35.0 | 1500 | PTMG | 42.6 | 3000 | 14 GB | 3.7 | 90 | MDI | 18.7 | 250 | 0.95 | 0.52 | 120 |

Example 1-1

The thermoplastic polyurethane a 100 parts by weight as the polyurethane (A) and β-cyclodextrin (trade name "Dexipearl β-100"; herein after referred to as "β-CD", average particle diameter: 20 μm, manufactured by Ensuiko Sugar Refining Co., Ltd.) 38.8 parts by weight as the water-soluble particles (C) were kneaded by means of a extruder heated at 160° C.

Then, the kneaded matter thus obtained was blended with dicumyl peroxide (trade name "Percumyl D-40"; herein after referred to as "D-40", manufactured by NOF CORPORATION) 3.0 parts by weight as the cross-linking agent (B), and the mixture was further kneaded at 120° C. to obtain a pelletized composition for forming a polishing layer.

The composition for forming a polishing layer described above was used to produce a chemical mechanical polishing pad and evaluate polishing characteristics thereof according to <Production and evaluation of chemical mechanical polishing pad> described above. The results thereof are shown in Table 4.

The chemical compositions of compositions for forming a polishing layer obtained in Examples 1-2 to 1-5 and Comparative Examples 1-1 to 1-2 are shown in Table 3 together with the composition of the composition for forming a polishing layer obtained in Example 1-1.

Example 1-2

A pelletized composition for forming a polishing layer was obtained in the same manner as in Example 1-1, except that, 100 parts by weight of the thermoplastic polyurethane b described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 4.

Example 1-3

A pelletized composition for forming a polishing layer was obtained in the same manner as in Example 1-1, except that, 100 parts by weight of the thermoplastic polyurethane c described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 4.

Example 1-4

A pelletized composition for forming a polishing layer was obtained in the same manner as in Example 1-1, except that, 100 parts by weight of the thermoplastic polyurethane d described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 4.

Example 1-5

The thermoplastic polyurethane d 100 parts by weight as the polyurethane (A) and "β-CD" described above 38.8 parts by weight as the water-soluble particles (C) were kneaded by means of a extruder heated at 160° C. Then, the kneaded matter thus obtained was blended with 2,5-dimethyl-2,5-bis (t-butylperoxy)hexane (trade name "Perhexa 25B40", manufactured by NOF CORPORATION) 3.0 parts by weight as the cross-linking agent (B), and the mixture was further kneaded at 140° C. to obtain a pelletized composition for forming a polishing layer. The composition for forming a polishing layer described above was used to produce a chemical mechanical polishing pad and evaluate polishing characteristics thereof according to <Production and evaluation of chemical mechanical polishing pad> described above. The results thereof are shown in Table 4.

Comparative Example 1-1

The thermoplastic polyurethane d 100 parts by weight as the polyurethane (A) and "β-CD" described above 38.8 parts by weight as the water-soluble particles (C) were kneaded by means of a extruder heated at 160° C. to obtain a pelletized composition for forming a polishing layer. The composition for forming a polishing layer described above was used to produce a chemical mechanical polishing pad and evaluate polishing characteristics thereof according to <Production and evaluation of chemical mechanical polishing pad> described above. The results thereof are shown in Table 4.

Comparative Example 1-2

A pelletized composition for forming a polishing layer was obtained in the same manner as in Example 1-1, except that, 100 parts by weight of the thermoplastic polyurethane e described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 4.

TABLE 3

| | Polyurethane (A) | | Cross-linking agent (B) | | Water-soluble particles (C) | |
|---|---|---|---|---|---|---|
| | Kind | Weight part | Kind | Weight part | Kind | Weight part |
| Example 1-1 | a | 100 | D-40 | 3.0 | β-CD | 38.8 |
| Example 1-2 | b | 100 | D-40 | 3.0 | β-CD | 38.8 |
| Example 1-3 | c | 100 | D-40 | 3.0 | β-CD | 38.8 |
| Example 1-4 | d | 100 | D-40 | 3.0 | β-CD | 38.8 |
| Example 1-5 | d | 100 | Perhexa*[1] | 3.0 | β-CD | 38.8 |
| Comparative Example 1-1 | d | 100 | — | — | β-CD | 38.8 |
| Comparative Example 1-2 | e | 100 | D-40 | 3.0 | β-CD | 38.8 |

*[1]Perhexa shows Perhexa 25B40

TABLE 4

| | Polishing rate (nm/minute) | Dishing (nm) | Scratch (number) |
|---|---|---|---|
| Example 1-1 | 724 | 45 | 40 |
| Example 1-2 | 798 | 31 | 20 |
| Example 1-3 | 809 | 23 | 22 |
| Example 1-4 | 821 | 15 | 25 |
| Example 1-5 | 857 | 13 | 30 |
| Comparative Example 1-1 | 664 | 215 | 18 |
| Comparative Example 1-2 | 678 | 184 | 25 |

A polishing rate of 700 nm/minute or more, dishing of 60 nm or less and 50 or less scratches make the polishing characteristics particularly good.

According to the results shown in Table 4, it has become clear that the chemical mechanical polishing pads obtained from the compositions for forming a polishing layer according to the present invention (Examples 1-1 to 1-5) have good polishing characteristics.

In contrast with this, the chemical mechanical polishing pad obtained from the composition containing no cross-linking agent (Comparative Example 1-1) had a sufficiently high scratch performance but was unsatisfactory in performances of a polishing rate and a planarity (dishing). Further, the chemical mechanical polishing pad obtained from the composition (Comparative Example 1-2) prepared by using the polyurethane e provided as well the same results.

As apparent from the results obtained in the examples and the comparative examples described above, use of the compositions for forming a polishing layer according to the present invention makes it possible to produce the chemical mechanical polishing pads having a polishing layer which is excellent in a polishing rate, a planarity (dishing) and a performance of scratch.

Example 2-1

The thermoplastic polyurethane A described above 100 parts by weight as the polyurethane (A) and "β-CD" described above 2 parts by weight as the water-soluble particles (C) were kneaded by means of a extruder heated at 140° C. Then, the kneaded matter thus obtained was blended with "D-40" described above 1.5 part by weight (corresponding to 0.6 part by weight in terms of pure dicumyl peroxide) as the cross-linking agent (B), and the mixture was further kneaded at 120° C. to obtain a pelletized composition for forming a polishing layer.

The composition for forming a polishing layer described above was used to produce a chemical mechanical polishing pad and evaluate polishing characteristics thereof according to <Production and evaluation of chemical mechanical polishing pad> described above. The results thereof are shown in Table 5. The chemical compositions of compositions for forming a polishing layer obtained in Examples 2-2 to 2-17 and Comparative Examples 2-1 to 2-3 are shown in Table 5 to Table 7 together with the composition of the composition for forming a polishing layer obtained in Example 2-1.

Example 2-2

A pelletized composition for forming a polishing layer was obtained in the same manner as in Example 2-1, except that, used were 100 parts by weight of the thermoplastic polyurethane B described above as the polyurethane (A) and 34 parts by weight of "β-CD" described above as the water-soluble particles (C). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-3

A pelletized composition for forming a polishing layer was obtained in the same manner as in Example 2-1, except that, used were 100 parts by weight of the thermoplastic polyurethane C described above as the polyurethane (A) and 171 parts by weight of potassium sulfate (manufactured by Otsuka Chemical Co., Ltd.; herein referred to as "potassium sulfate") as the water-soluble particles (C). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-4

A pelletized composition for forming a polishing layer was obtained in the same manner as in Example 2-1, except that, used were 100 parts by weight of the thermoplastic polyurethane D described above as the polyurethane (A), 0.75 part by weight (corresponding to 0.3 part by weight in terms of pure dicumyl peroxide) of "D-40" described above as the cross-linking agent (B) and 15 parts by weight of "β-CD" as the water-soluble particles (C). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-5

A pelletized composition for forming a polishing layer was obtained in the same manner as in Example 2-1, except that, used were 100 parts by weight of the thermoplastic polyurethane E described above as the polyurethane (A), 7 parts by weight (corresponding to 2.8 parts by weight in terms of pure dicumyl peroxide) of "D-40" as the cross-linking agent (B) and 58 parts by weight of "β-CD" as the water-soluble particles (C). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-6

A pelletized composition for forming a polishing layer was obtained in the same manner as in Example 2-1, except that, used were 100 parts by weight of the thermoplastic polyurethane F described above as the polyurethane (A), 8 parts by weight (corresponding to 3.2 parts by weight in terms of pure dicumyl peroxide) of "D-40" as the cross-linking agent (B) and 90 parts by weight of "β-CD" as the water-soluble particles (C). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-7

A pelletized composition for forming a polishing layer was obtained in the same manner as in Example 2-1, except that, used were 100 parts by weight of the thermoplastic polyurethane G described above as the polyurethane (A) and 110 parts by weight of "potassium sulfate" described above as the water-soluble particles (C). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-8

A pelletized composition for forming a polishing layer was obtained in the same manner as in Example 2-2, except that, 100 parts by weight of the thermoplastic polyurethane H described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-9

A pelletized composition for forming a polishing layer was obtained in the same manner as in Example 2-2, except that, 100 parts by weight of the thermoplastic polyurethane I described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-10

A pelletized composition for forming a polishing layer was obtained in the same manner as in Example 2-2, except that, used were 100 parts by weight of the thermoplastic polyurethane J described above as the polyurethane (A) and 1 part by weight (corresponding to 0.4 part by weight in terms of pure peroxide) of 2,5-dimethyl-2,5-bis(t-butylperoxy)hexane (trade name "Perhexa 25B40", manufactured by NOF CORPORATION) as the cross-linking agent (B). The composition for forming a polishing layer described above was used to produce a chemical mechanical polishing pad and evaluate polishing characteristics thereof according to <Production and evaluation of chemical mechanical polishing pad> described above. The results thereof are shown in Table 5.

Example 2-11

A pelletized composition for forming a polishing layer was obtained in the same manner as in Example 2-2, except that, 100 parts by weight of the thermoplastic polyurethane M described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 6.

Example 2-12

A pelletized composition for forming a polishing layer was obtained in the same manner as in Example 2-2, except that, used were 100 parts by weight of the thermoplastic polyure-

Example 2-13

A pelletized composition for forming a polishing layer was obtained in the same manner as in Example 2-2, except that, 100 parts by weight of the thermoplastic polyurethane O described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 6.

Example 2-14

A pelletized composition for forming a polishing layer was obtained in the same manner as in Example 2-2, except that, 100 parts by weight of the thermoplastic polyurethane L described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 6.

Example 2-15

A pelletized composition for forming a polishing layer was obtained in the same manner as in Example 2-2, except that, 100 parts by weight of the thermoplastic polyurethane K described above was used as the polyurethane (A). The composition for forming a polishing layer described above was used to produce a chemical mechanical polishing pad and evaluate polishing characteristics thereof according to <Production and evaluation of chemical mechanical polishing pad> described above. The results thereof are shown in Table 6.

Example 2-16

A pelletized composition for forming a polishing layer was obtained in the same manner as in Example 2-1, except that, 2 parts by weight (corresponding to 0.8 part by weight in terms of pure dicumyl peroxide) of "D-40" described above was used as the cross-linking agent (B) and that the water-soluble particles (C) were not used. The composition for forming a polishing layer described above was used to produce a chemical mechanical polishing pad and evaluate polishing characteristics thereof according to <Production and evaluation of chemical mechanical polishing pad> described above. The results thereof are shown in Table 6.

Example 2-17

A pelletized composition for forming a polishing layer was obtained in the same manner as in Example 2-1, except that, used were 100 parts by weight of the thermoplastic polyurethane P described above as the polyurethane (A) and 2.5 parts by weight (corresponding to 1.0 part by weight in terms of pure dicumyl peroxide) of "D-40" as the cross-linking agent (B) and that the water-soluble particles (C) were not used. The composition for forming a polishing layer described above was used to produce a chemical mechanical polishing pad and evaluate polishing characteristics thereof according to <Production and evaluation of chemical mechanical polishing pad> described above. The results thereof are shown in Table 6.

Comparative Example 2-1

Used were 100 parts by weight of the thermoplastic polyurethane A described above as the thermoplastic polyurethane and 34 parts by weight of "β-CD" described above as the water-soluble particles (C), and the mixture was kneaded by means of a extruder heated at 140° C. to obtain pellets. The pellets described above were heated and compressed at 150° C. for 5 minutes in a mold, and then the mold was cooled down to room temperature to thereby obtain a cylindrical molding having a diameter of 790 mm and a thickness of 3.2 mm.

Next, a rectangular through-hole having a length of 58 mm in a radial direction and a length of 22 mm in a tangent line direction was formed by means of an end mill (manufactured by KATO MACHINE CORPORATE) such that the center of the rectangular through-hole was 105 mm away from the center of the molding. A polishing layer substrate having a hole part was thus produced.

The polishing layer substrate described above was set again in the mold, and the hole part of the polishing layer substrate was filled with the raw material composition for a transparent member prepared in "(2) Preparation of raw material composition for transparent member" described above.

Then, a metal block having almost the same planar shape and size and a thickness of 1.5 mm was put into a residual space of the hole part, and heating and compressing was carried out at 150° C. for 5 minutes. Thereafter, the mold was cooled down to room temperature, whereby obtained was a cylindrical molding which had a diameter of 790 mm and a thickness of 3.2 mm and in which the transparent member was fused. Then, the same procedure as in <Production and evaluation of chemical mechanical polishing pad> described above was carried out to produce a chemical mechanical polishing pad and evaluate polishing characteristics thereof. The results thereof are shown in Table 7.

Comparative Example 2-2

Used were 100 parts by weight of the thermoplastic polyurethane K described above as the thermoplastic polyurethane and 34 parts by weight of "β-CD" described above as the water-soluble particles (C), and the mixture was kneaded by means of a extruder heated at 180° C. to obtain pellets. The pellets described above were used to produce a chemical mechanical polishing pad and evaluate polishing characteristics thereof in the same manner as in Comparative Example 2-1. The results thereof are shown in Table 7.

Comparative Example 2-3

Used were 100 parts by weight of the thermoplastic polyurethane L described above as the thermoplastic polyurethane and 34 parts by weight of "β-CD" as the water-soluble particles (C), and the mixture was kneaded by means of a extruder heated at 200° C. to obtain pellets. The pellets described above were used to produce a chemical mechanical polishing pad and evaluate polishing characteristics thereof in the same manner as in Comparative Example 2-1. The results thereof are shown in Table 7.

TABLE 5

|  |  | Example | | | | | | | | | |
| --- | --- | --- | --- | --- | --- | --- | --- | --- | --- | --- | --- |
|  |  | 2-1 | 2-2 | 2-3 | 2-4 | 2-5 | 2-6 | 2-7 | 2-8 | 2-9 | 2-10 |
| Polyurethane (A) | Kind | A | B | C | D | E | F | G | H | I | J |
|  | Weight part | 100 | 100 | 100 | 100 | 100 | 100 | 100 | 100 | 100 | 100 |
| Cross-linking agent (B) | Kind | D-40 | D-40 | D-40 | D-40 | D-40 | D-40 | D-40 | D-40 | D-40 | Perhexa[*2] |
|  | Weight part[*1] | 0.6 | 0.6 | 0.6 | 0.3 | 2.8 | 3.2 | 0.6 | 0.6 | 0.6 | 0.4 |
| Water-soluble particles (C) | Kind | β-CD | β-CD | Potassium sulfate | β-CD | β-CD | β-CD | Potassium sulfate | β-CD | β-CD | β-CD |
|  | Weight part | 2 | 34 | 171 | 15 | 58 | 90 | 110 | 34 | 34 | 34 |
| Polishing rate | (nm/min) | 770 | 800 | 820 | 830 | 750 | 760 | 800 | 810 | 790 | 780 |
| End point detection time | (second) | 98 | 95 | 100 | 92 | 110 | 108 | 102 | 98 | 105 | 106 |
| Dishing | (nm) | 30 | 10 | 35 | 16 | 40 | 45 | 50 | 33 | 36 | 38 |
| Scratches | (number) | 25 | 15 | 20 | 40 | 44 | 32 | 28 | 48 | 40 | 38 |
| Residual strain | (%) | 4 | 3 | 2 | 6 | 1 | 1 | 2 | 3 | 4 | 2 |
| Duro D hardness |  | 58 | 65 | 74 | 61 | 78 | 81 | 70 | 64 | 62 | 68 |

[*1] A weight part of D-40 is a value reduced to pure dicumyl peroxide. A weight part of Perhexa 25B40 is a value reduced to pure peroxide.
[*2] Perhexa shows Perhexa 25B40.

TABLE 6

|  |  | Example | | | | | | |
| --- | --- | --- | --- | --- | --- | --- | --- | --- |
|  |  | 2-11 | 2-12 | 2-13 | 2-14 | 2-15 | 2-16 | 2-17 |
| Polyurethane (A) | Kind | M | N | O | L | K | A | P |
|  | Weight part | 100 | 100 | 100 | 100 | 100 | 100 | 100 |
| Cross-linking agent (B) | Kind | D-40 | D-40 | D-40 | D-40 | D-40 | D-40 | D-40 |
|  | Weight part[*1] | 0.6 | 0.6 | 0.6 | 0.6 | 0.6 | 0.8 | 1.0 |
| Water-soluble particles (C) | Kind | β-CD | Potassium sulfate | β-CD | β-CD | β-CD | — | — |
|  | Weight part | 34 | 257 | 34 | 34 | 34 | — | — |
| Polishing rate | (nm/min) | 650 | 680 | 750 | 800 | 820 | 740 | 730 |
| End point detection time | (second) | 150 | 170 | 145 | 98 | 96 | 120 | 150 |
| Dishing | (nm) | 45 | 30 | 45 | 45 | 40 | 55 | 70 |
| Scratches | (number) | 25 | 40 | 85 | 90 | 95 | 60 | 60 |
| Residual strain | (%) | 3 | 1 | 3 | 7 | 5 | 3 | 4 |
| Duro D hardness |  | 60 | 83 | 62 | 66 | 63 | 54 | 65 |

[*1] A weight part of D-40 is a value reduced to pure dicumyl peroxide.

TABLE 7

|  |  | Comparative Example | | |
| --- | --- | --- | --- | --- |
|  |  | 2-1 | 2-2 | 2-3 |
| Thermoplastic Polyurethane | Kind | A | K | L |
|  | Weight part | 100 | 100 | 100 |
| Cross-linking agent (B) | Kind | — | — | — |
|  | Weight part[*1] | — | — | — |
| Water-soluble particles (C) | Kind | β-CD | β-CD | β-CD |
|  | Weight part | 34 | 34 | 34 |
| Polishing rate | (nm/min) | 200 | 760 | 780 |
| End point detection time | (second) | 950 | 830 | 700 |
| Dishing | (nm) | 480 | 425 | 385 |
| Scratches | (number) | 35 | 20 | 30 |
| Residual strain | (%) | 15 | 13 | 18 |
| Duro D hardness |  | 42 | 45 | 40 |

[*1] A weight part of D-40 is a value reduced to pure dicumyl peroxide.

A polishing rate of 700 nm/minute or more, an end point detection time of 110 seconds or shorter, dishing of 60 nm or less and 50 or less scratches make the polishing characteristics particularly good.

According to the results shown in Table 5, it has become clear that the chemical mechanical polishing pads obtained from the compositions for forming a polishing layer according to the present invention (Examples 2-1 to 2-10) have particularly good polishing characteristics.

Further, according to the results shown in Table 6, it has become clear that the chemical mechanical polishing pads obtained from the compositions for forming a polishing layer according to the present invention (Examples 2-11 to 2-12) are provided with good polishing characteristics in a planarity (dishing), a performance of scratch, a residual strain of the polishing layer and a hardness (a duro D hardness) of the polishing layer without damaging polishing characteristics such as a polishing rate and an end point detection time to a large extent.

Also, it has become clear that the chemical mechanical polishing pads obtained from the compositions for forming a polishing layer according to the present invention (Examples 2-13 to 2-15) are a little inferior in a performance of scratch but have good polishing characteristics in the other performances.

Further, it has become clear that the chemical mechanical polishing pads obtained from the compositions for forming a polishing layer according to the present invention (Examples 2-16 to 2-17) have polishing characteristics which are good to some extent as compared with those of the chemical mechanical polishing pads obtained from the compositions for forming a polishing layer prepared in Examples 2-1 to 2-10.

In contrast with this, according to the results shown in Table 7, the chemical mechanical polishing pads obtained from the compositions containing no cross-linking agent (Comparative Examples 2-1 to 2-3) had a sufficiently high scratch performance but were unsatisfactory in a polishing rate, an end point detection time, a planarity (dishing), a residual strain of the polishing layer and a hardness (a duro D hardness) of the polishing layer.

As apparent from the results obtained in the examples and the comparative examples described above, use of the compositions for forming a polishing layer according to the present invention makes it possible to produce the chemical mechanical polishing pads having a polishing layer which is excellent in a polishing rate, an end point detection time, a planarity (dishing) and a performance of scratches and which is excellent in a processability.

What is claimed is:

1. A chemical mechanical polishing pad having a polishing layer formed by heating a composition for forming a polishing layer of the chemical mechanical polishing pad to thereby cross-link the composition,
    wherein the composition comprises:
    (A) a polyurethane having a carbon-carbon double bond on a side chain and having a conjugated diene (co)polymer skeleton, wherein the carbon-carbon double bond is derived from the conjugated diene (co)polymer; and
    (B) a cross-linking agent,
    wherein grooves suitable for holding a slurry are provided on a surface of the polishing layer brought into contact with an object to be polished,
    wherein the polyurethane (A) is a thermoplastic polyurethane (A') obtained by mixing at least components (a11) to (a13) and component (a2):
    (a11) an oligomer which has one or more hydroxyl groups and one or more carbon-carbon double bonds and which has a number average molecular weight of 500 to 2500,
    (a12) an oligomer which has two or more hydroxyl groups and either one or both of an ether bond and an ester bond and which has a number average molecular weight of 500 to 2500 and is different from the component (a11);
    (a13) a monomer having two hydroxyl groups; and
    (a2) a monomer having two isocyanate groups, in a proportion satisfying conditions (1) and (2):
    (1) a value of M-1/M-OH is 0.85 to 1.10 and
    (2) a value of M-2/M-OH is 0.45 to 0.80,
    wherein M-1 is the number of isocyanate groups contained in the component (a2), M-2 is the number of hydroxyl groups contained in the component (a13) and M-OH is the total number of hydroxyl groups contained in the components (a11), (a12), and (a13),
    and reacting them.

2. A method of chemical mechanical polishing, the method comprising:
    contacting a surface with the chemical mechanical polishing pad of claim 1.

3. The pad of claim 1, wherein the composition further comprises water-soluble particles (C).

4. The pad of claim 1, wherein the cross-linking agent (B) is an organic peroxide, sulfur, or a sulfur compound.

5. A chemical mechanical polishing pad having a polishing layer formed by heating a composition for forming a polishing layer of the chemical mechanical polishing pad to thereby cross-link the composition,
    wherein the composition comprises:
    (A) a polyurethane having a carbon-carbon double bond on a side chain and having a conjugated diene (co)polymer skeleton, wherein the carbon-carbon double bond is derived from the conjugated diene (co)polymer; and
    (B) a cross-linking agent,
    wherein grooves suitable for holding a slurry are provided on a surface of the polishing layer brought into contact with an object to be polished
    wherein the polyurethane (A) comprises a vinyl group and an allyl group on a side chain.

6. The pad of claim 1, wherein the cross-linking agent (B) is an organic peroxide.

7. The pad of claim 1, wherein the cross-linking agent (B) is sulfur.

8. The pad of claim 1, wherein the cross-linking agent (B) is a sulfur compound.

9. The pad of claim 1, wherein the conjugated diene (co)polymer skeleton comprises a butadiene homopolymer, an isoprene homopolymer, a butadiene-styrene copolymer, a butadiene-isoprene copolymer, a butadiene-acrylonitrile copolymer, a butadiene-2-ethylhexyl acrylate copolymer, or a butadiene-n-octadecyl acrylate copolymer.

10. The pad of claim 1, wherein the conjugated diene (co)polymer skeleton comprises polyisoprene.

* * * * *